(12) United States Patent
Bito et al.

(10) Patent No.: US 6,593,030 B2
(45) Date of Patent: Jul. 15, 2003

(54) NON-AQUEOUS ELECTROLYTE SECONDARY BATTERY

(75) Inventors: Yasuhiko Bito, Osaka (JP); Toshitada Sato, Osaka (JP); Yoshiaki Nitta, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 119 days.

(21) Appl. No.: 09/798,846

(22) Filed: Mar. 1, 2001

(65) Prior Publication Data

US 2001/0044046 A1 Nov. 22, 2001

(30) Foreign Application Priority Data

Mar. 6, 2000 (JP) ........................................ 2000-061123

(51) Int. Cl.[7] .............................. H01M 4/38; H01M 4/62
(52) U.S. Cl. .................... 429/218.1; 429/220; 429/223; 429/231.5; 429/231.6; 429/231.95; 429/232
(58) Field of Search ............................. 429/218.1, 223, 429/224, 221, 231.5, 231.6, 231.95, 220

(56) References Cited

U.S. PATENT DOCUMENTS 4,233,376 A * 11/1980 Atkinson et al. ....... 429/224 X
4,950,566 A    8/1990 Huggins et al.
5,792,574 A * 8/1998 Mitate et al. ............ 429/218.1
2002/0136953 A1 * 9/2002 Vaughey et al. ......... 429/218.1

FOREIGN PATENT DOCUMENTS

| JP | 04126371 A |   | 4/1992 | |
| JP | 07288123 A |   | 10/1995 | |
| JP | 08124568 A |   | 5/1996 | |
| JP | 10223221 A |   | 8/1998 | |
| WO | WO 93/08981 | * | 5/1993 | ............ H01M/4/40 |

OTHER PUBLICATIONS

M.M. Thackeray et al., "Intermetallic Insertion Electrodes Derived From NiAS–, $Ni_2In$–, and $Li_2CuSn$–type Structures for Lithium–ion Batteries", *Electrochemsitry Communications*, vol. 18, No. 1, pp. 111–115, (Mar. 1999).

* cited by examiner

*Primary Examiner*—Stephen Kalafut
(74) *Attorney, Agent, or Firm*—Akin, Gump, Strauss, Hauer & Feld, L.L.P.

(57) ABSTRACT

The present invention provides a rechargeable negative electrode for a non-aqueous electrolyte secondary battery comprising an alloy material which absorbs lithium during charge and desorbs lithium during discharge, and having a long cycle life. The negative electrode includes an alloy having a hexagonal closest packing structure and a $Ni_2In$ type structure composed of at least two elements.

12 Claims, 3 Drawing Sheets

NON-AQUEOUS ELECTROLYTE SECONDARY BATTERY

BACKGROUND OF THE INVENTION

The present invention relates to improvements of a negative electrode of non-aqueous electrolyte secondary batteries. More specifically, this invention relates to a non-aqueous electrolyte secondary battery having a high electric capacity, having a highly reliable negative electrode free from dendrites, and offering a high energy density without a fear of occurrence of internal short circuit caused by dendrites.

Non-aqueous electrolyte secondary batteries having a negative electrode of lithium or lithium compounds have been attracting a great deal of attention because they afford a high discharge voltage and a high energy density, and therefore extensive investigations have been made about such batteries.

Conventionally known positive electrode active materials for use in the non-aqueous electrolyte secondary battery include oxides or chalcogenides of transition metals such as $LiMn_2O_4$, $LiCoO_2$, $LiNiO_2$, $V_2O_5$, $Cr_2O_5$, $MnO_2$, $TiS_2$, $MoS_2$ and the like. These compounds have a layered or tunneled crystal structure permitting intercalation and deintercalation of lithium ions. On the other hand, as a negative electrode active material, the use of metallic lithium has been investigated extensively. However, metallic lithium, when used in the negative electrode, has an inevitable issue of deposition of lithium dendrites on the surface of metallic lithium during the charge, which impairs charge and discharge efficiency or induces internal short circuit due to the contact of such lithium dendrites with the positive electrode. At the present time, there have been put into practice lithium ion batteries using, in the negative electrode, a graphite type carbon material which is capable of reversibly absorbing therein and desorbing therefrom lithium and which is excellent in terms of cycle characteristics and safety although it has smaller capacity than metallic lithium.

However, when a graphite material is used in the negative electrode, its theoretical capacity is 372 mAh/g, which is about one tenth of metallic lithium, and its theoretical density is as low as 2.2 g/cc. When the material is made into a negative electrode sheet in practice, the density decreases further. For such a reason, the use of a material having a higher capacity per volume is desired with a view to realizing a battery with a higher capacity.

Under the circumstances, proposals have been made about the use of oxides in the negative electrode in order to realize a further higher capacity. For example, there is proposed the use of amorphous oxides such as $SnSiO_3$ and $SnSi_{1-x}PxO_3$ in the negative electrode in order to improve cycle characteristics (Japanese Laid-Open Patent Publication No. Hei 7-288123). However, when such oxides are used in the negative electrode, the difference between the initial charge capacity and the discharge capacity, i.e., irreversible capacity, is extremely large, which makes it difficult to put this into practical use.

On the other hand, various proposals have also been made about the use of alloy materials in the negative electrode. For example, there is proposed the use of inter-metallic compounds formed by alloying a metallic element which is electrochemically inactive with lithium, such as iron and nickel, together with an element which can electrochemically alloy with lithium, such as aluminum and tin (Japanese Laid-Open Patent Publication No. Hei 10-223221). With this measure, a negative electrode material having an extremely high capacity is supposed to be achieved. Nevertheless, even with this measure, the short cycle life and the expansion of the negative electrode mixture caused by the intercalation of lithium cannot be avoided, which makes it difficult to put this into practical use.

BRIEF SUMMARY OF THE INVENTION

In view of the problems as described above, the present invention has an object to provide a negative electrode which permits a non-aqueous electrolyte secondary battery having a high capacity and excellent charge and discharge cycle characteristics.

The present invention provides a negative electrode comprising an alloy material which absorbs lithium during charge and desorbs lithium during discharge, developing no dendrites, offering a high electric capacity, suffering little expansion during the charge, and having a long cycle life.

The present invention provides a non-aqueous electrolyte secondary battery comprising a rechargeable positive electrode, a non-aqueous electrolyte containing a lithium salt and a rechargeable negative electrode, wherein the negative electrode includes an alloy having a hexagonal closest packing structure and a $Ni_2In$ type structure composed of at least two elements.

Herein, the aforementioned alloy preferably comprises an intermetallic compound containing at least one element selected from the group consisting of Sn, Si and In.

The aforementioned alloy preferably comprises at least one intermetallic compound selected from the group consisting of $Ti_2Sn$, $NiCoSn$, $Mn_2Sn$, $Ni_3Sn_2$, $BeSiZr$, $Co_3Sn_2$, $Cu_2In$, $Ni_2In$, $Ni_2Si$, $Pd_3Sn_2$ and $Rh_3Sn_2$.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

As described previously, the negative electrode of the present invention comprises an alloy having a hexagonal closest packing structure and a $Ni_2In$ type structure composed of at least two elements.

It is known that the alloy negative electrode of this type charges and discharges by electrochemical alloying and deintercalation reaction between an element such as tin, aluminum and the like, and lithium. However, as described previously, the alloy negative electrode repeats expansion and contraction along with the intercalation and deintercalation of lithium, and the negative electrode is liable to be pulverized by mechanical stress. This phenomenon is a principal cause for the deterioration of the cycle characteristics.

The negative electrode using the alloy of the present invention does not expand or contract excessively although it offers a high capacity, and it exhibits favorable charge and discharge cycle characteristics. The reason for this is considered that, while the aforementioned conventional alloy negative electrode causes the reaction as shown in the following formula (1) or (2), the alloy of the present invention causes the reaction of the following formula (3).

$$M^1 + xLi^+ = Li_x M^1 \qquad (1)$$

$$M_y^1 M_z^2 + xLi^+ = zM^2 + Li_x M_y^1 \qquad (2)$$

$$M_y^1 M_z^2 + xLi^+ = Li_x M_y^1 M_z^2 \qquad (3)$$

In the above formulae (1) to (3), $M^1$ represents an element capable of being electrochemically alloyed with lithium, such as tin, aluminum and the like. $M^2$ is an element inactive with lithium, such as iron, nickel, copper and the like. X, y and z are respectively any positive numbers. A part of $M^1$ and $M^2$ may be replaced with other elements provided that they form effectively the aforementioned $Ni_2In$ type structure.

Figure 1B:
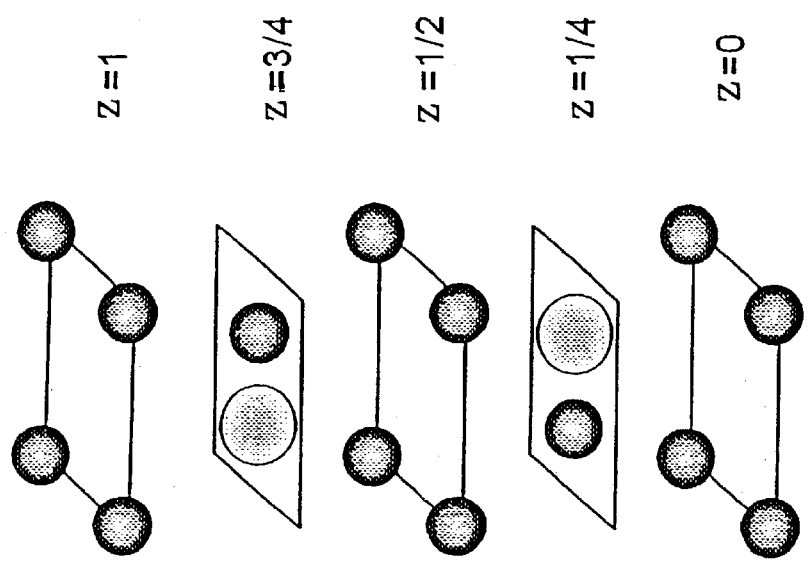
FIG. 1B is a diagram showing a laminated structure in the z axis direction of the above crystal structure.
Figure 1A:
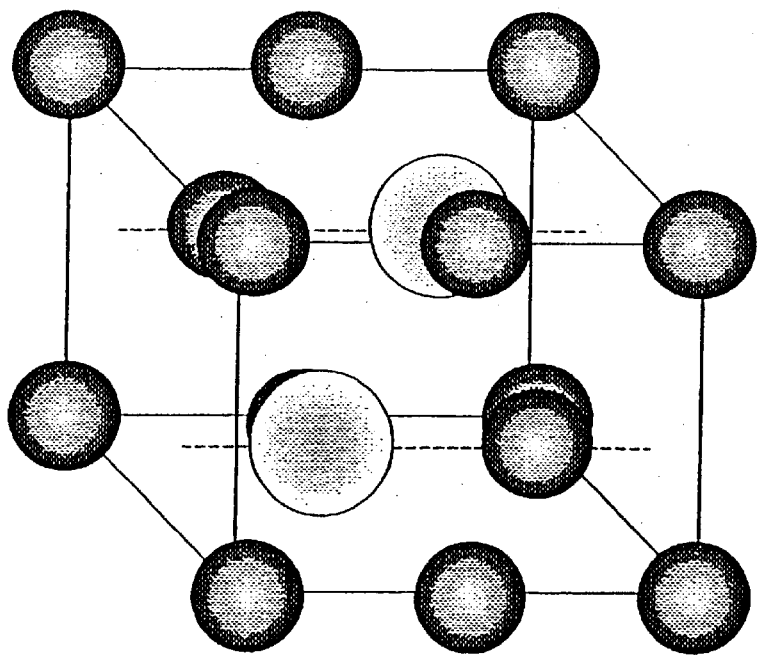
FIG. 1A is a diagram illustrating a model of a crystal structure of a negative electrode alloy of the present invention.

The reason why the alloy contained in the negative electrode of the present invention causes different reaction from the conventional alloy, as described previously, derives from the fact that it has a hexagonal closest packing structure and a $Ni_2In$ type structure. FIG. 1A and FIG. 1B show a model of the structure of the alloy of the invention. FIG. 1A shows a model of the crystal structure and FIG. 1B shows a laminated structure in the z axis direction. Referring to previously mentioned $M^1$ and $M^2$, the element corresponding to $M^1$ takes positions of ($\frac{1}{3}$, $\frac{2}{3}$, $\frac{1}{4}$) and ($\frac{2}{3}$, $\frac{1}{3}$, $\frac{3}{4}$) in FIG. 1A. As shown in FIG. 1B, the layers formed only with M and the layers in which $M^1$ and $M^2$ align alternately are stacked in the z axis direction in a layered structure.

This structure is considered to stabilize the initial structure by preventing excessive lithium from being intercalated in the layers formed only with $M^2$ during alloying reaction (charge) between $M^1$ and lithium.

In the conventional alloy, excessive lithium is reacted during the first charge. For example, a maximum of 4.4 atoms of lithium are capable of alloying with one tin atom. As a result, the initial crystal structure is broken. At this moment, the alloy expands to be pulverized as described previously, causing deterioration in the cycle characteristics.

Also, since $M^1$ and $M^2$ are present alternately on a plane constituting the same layer, coagulation of $M^1$ atoms caused by the alloying reaction with lithium is suppressed, facilitating further stabilization of the structure.

The element selected as $M^1$ may be any element provided that it alloys electrochemically with lithium. Sn, Si and In are preferable, and Sn and In are particularly preferable.

The intermetallic compound constituting the alloy of the present invention is preferably at least one compound selected from the group consisting of $Ti_2Sn$, $NiCoSn$, $Mn_2Sn$, $Ni_3Sn_2$, $BeSiZr$, $Co_3Sn_2$, $Cu_2In$, $Ni_2In$, $Ni_2Si$, $Pd_3Sn_2$ and $Rh_3Sn_2$. Particularly preferably, it is selected from the group consisting of $Ti_2Sn$, $NiCoSn$, $Mn_2Sn$, $Co_3Sn_2$, $Cu_2In$ and $Ni_2In$.

In order to allow the crystal structure of these intermetallic compounds to have distortion, a part of the constituting elements may be replaced with other elements.

The alloy of the present invention is preferably either amorphous or low crystalline. Further, it is desirable that the grain size is 10 μm or less. Particularly preferably, the grain size is 1 μm or less. The charge and discharge capacity tends to increase by the fact that the alloy is amorphous or low crystalline. The reason for this is considered that a space capable of accommodating lithium is created by being amorphous. It is considered that, by being low crystalline or minute crystalline, the grain size is decreased, making lithium ions readily pass through the space between the grains, thereby facilitating the reaction.

The average particle size of the alloy used in the negative electrode of the present invention is preferably 45 μm or less, particularly preferably 30 μm or less. The reason for this is, since the thickness of the mixture layer of the negative electrode plate is generally 100 μm or less, the surface of the electrode plate becomes uneven if the particle size of the alloy is larger, which may cause short circuit or the like.

The negative electrode of the present invention preferably comprises a mixture of the alloy satisfying the condition as above with a conductive agent. Although the electronic conductivity of the negative electrode can be maintained only with the alloy, the electronic conductivity can be further improved by adding a conductive agent. As the conductive agent, it is preferred to use a graphite or carbon material such as carbon black, acetylene black and the like. The characteristics of the negative electrode are particularly improved when a graphite material is added as the conductive agent. This is considered not only because graphite itself is involved in the charge and discharge reaction, but also because it has an electrolyte-retaining property of carbon material and an ability to ease the contraction and the expansion of the alloy.

The alloy of the present invention is preferably synthesized by a solid phase synthesizing method such as mechanical alloying method, mechanomilling method and the like. The solid phase synthesizing method, whose typical example is mechanical alloying method, is suitable for obtaining amorphous or low crystalline alloys of a fine particle diameter. This is the most suitable synthesizing method for the alloy of the present invention.

Also, it is possible to synthesize a similar alloy by melt quenching method, whose typical example is roll quenching method. As the melt quenching method, there are also water atomizing method, gas atomizing method, melt spinning method and the like. In particular, atomizing method is suitable for producing a large quantity of low crystalline alloys having a fine particle diameter.

The examples of the present invention will be described in the followings. However, the present invention should never be limited thereto.

EXAMPLES 1–30

The alloys used in the examples were prepared in the following synthesizing methods.

(1) Mechanical Alloying Method:

Powders of single elements (all of which have an average particle diameter of 75 μm or less) were mixed at a predetermined molar ratio and were put in a stainless steel bowl mill together with stainless steel bowls of 25 mm in diameter. The bowl mill was rotated for 24 hours with a roller with a rotation speed of 120 rpm under an argon atmosphere, and thereby an alloy was synthesized.

After the alloy obtained by the mechanical alloying method was recovered, it was passed through a sieve of 45 microns mesh, thereby giving active materials having average particle diameters of at largest 24 µm. The active materials obtained were all amorphous or low crystalline and their grain sizes were, at largest, 0.7 µm of $Ni_2Si$.

(2) Gas Atomizing Method:

After particles of single elements mixed at a predetermined molar ratio were molten at least two times in an arc melting furnace, an ingot obtained was pulverized into a coarse powder to give a raw material for atomization. Under an argon gas atmosphere, argon was sprayed at a spraying pressure of 100 kgf/cm at the molten raw material spouting from a nozzle of a melting pot made of alumina, and thereby alloy particles were obtained. For melting the atomization material, a high frequency melting furnace was used.

After the alloy obtained by the gas atomizing method was recovered, it was passed through a sieve of 45 microns mesh, giving active materials having an average particle diameter of at largest 30 µm. The active materials obtained were all low crystalline, and their grain sizes were, at largest, 5.4 µm of BeSiZr.

(3) Roll Quenching Method:

After particles of single elements mixed at a predetermined molar ratio were molten at least two times in an arc melting furnace, an ingot obtained was pulverized into a coarse powder to give a raw material. A single roll quenching apparatus was used as a roll quenching apparatus. As a material for the roll, copper was used; as a material for the nozzle, quartz was generally used, and in the case of a material having a high melting point such as Ti, a graphite nozzle was used. The roll rotating speed was set to a circumferential speed of 10 m/s, and the gas spraying pressure was set to 10 kgf/cm$^2$.

Figure 2:
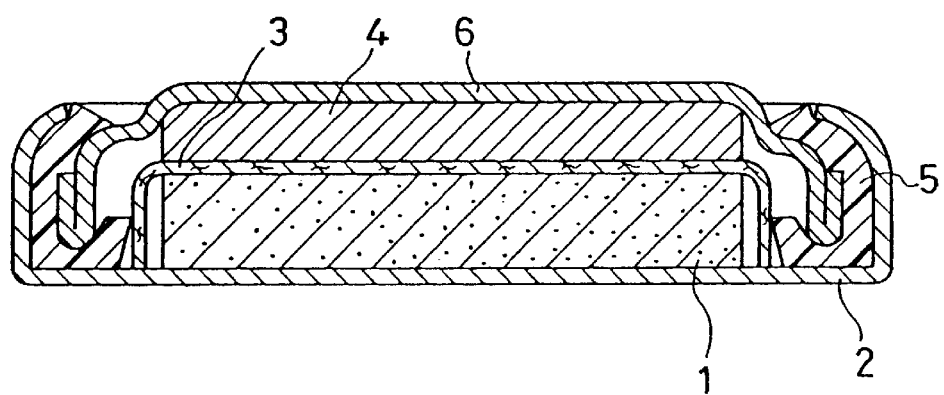
FIG. 2 is a longitudinal cross sectional view of a test cell used in examples of the present invention.

After the alloy obtained by the roll quenching method was recovered, it was pulverized into a coarse powder with a cutter mill. Then it was passed through a sieve of 45 microns mesh to give active materials having average particle diameters of at largest 33 µm. The active materials obtained were all either amorphous or low crystalline, and their grain sizes were, at largest, 1.8 µm of BeSiZr. 7.5 g of each of the aforementioned active material powders, 2 g of a graphite powder as a conductive agent, and 0.5 g of a polyethylene powder as a binder were mixed to give an electrode mixture. 0.1 g of each of the electrode mixtures was pressure molded to give a disk-like electrode 1 having a diameter of 17.5 mm. FIG. 2 shows a test cell configured using this electrode. The electrode 1 is placed in the center of a cell case 2, and a separator 3 made of microporous polypropylene film is mounted on the electrode 1.

After a non-aqueous electrolyte prepared by dissolving 1 mole/l lithium perchlorate ($LiClO_4$) in a solvent of ethylene carbonate and dimethoxyethane mixed at a volumetric ratio of 1:1 was poured onto the separator 3, a sealing plate 6, which is provided with a disk-like metallic lithium 4 having a diameter of 17.5 mm on its inner face and a gasket 5 made of polypropylene on its circumferential part, was combined with the case 2, and the opening edge of the case 2 was squeezed to seal the case 2. Test cells were thus prepared.

With each of the test cells, cathode polarization (corresponding to charge when the electrode 1 is regarded as the negative electrode) was carried out at a constant current of 2 mA until the electrode 1 showed 0 V relative to the lithium counter electrode 4. Next, anode polarization (corresponding to discharge) was carried out until the electrode 1 showed 1.5 V relative to the lithium counter electrode 4. Subsequently, a cycle of a cathode polarization and an anode polarization was repeated.

Initial discharge capacities per 1 g or 1 cc of the electrode mixtures each containing one of the active materials are shown in Table 1. The volume of the active material mixture was calculated from the weight and the volume after the pressure molding. With all the active materials, the test cells were disassembled after the first cathode polarization and also after a cycle of a cathode polarization and an anode polarization was repeated for 10 times, and the test electrodes were taken out for observation. No deposition of metallic lithium was observed on the electrode surface. In this manner, no occurrence of dendrites was confirmed in the electrode using the active materials of the examples.

Figure 3:
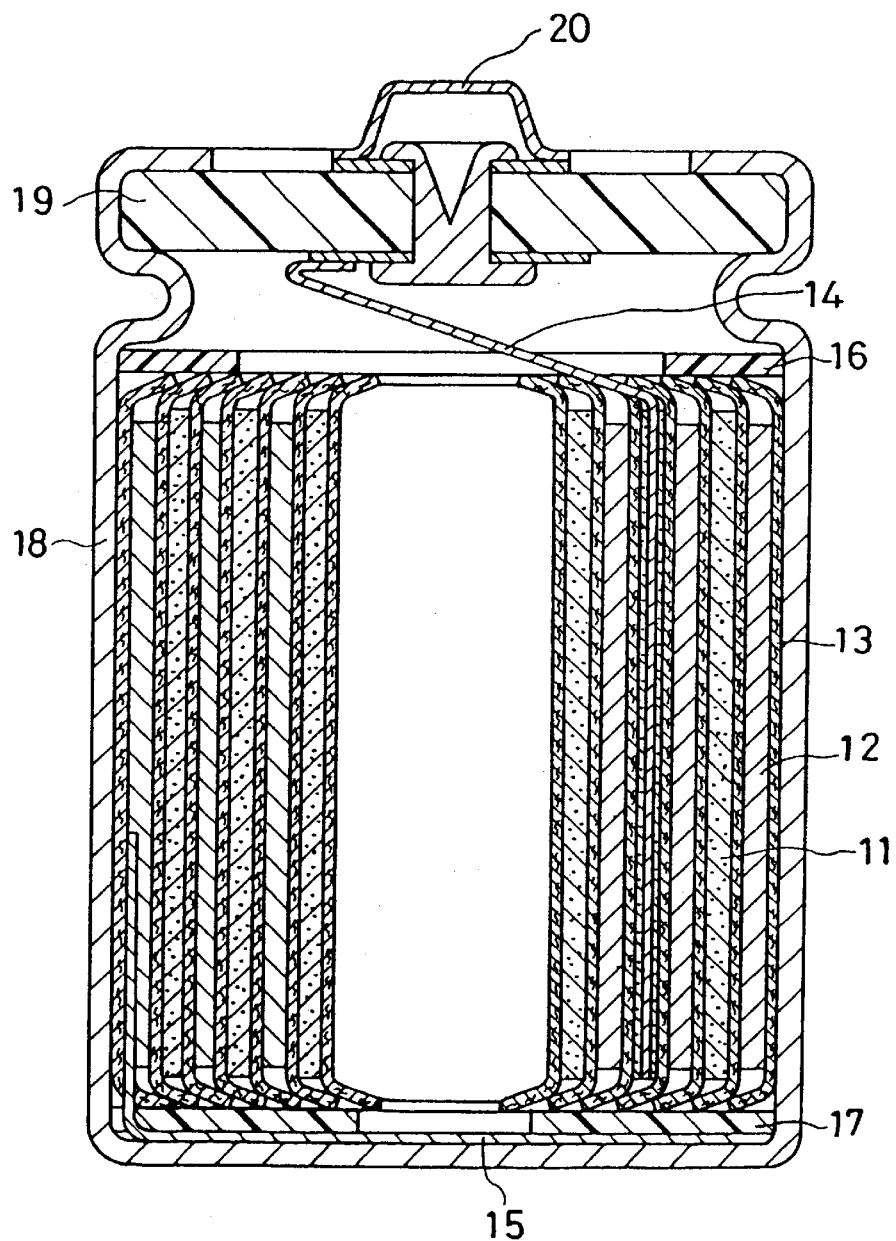
FIG. 3 is a longitudinal cross sectional view of a cylindrical battery used in examples of the present invention.

Next, in order to evaluate the cycle characteristics of cells using the aforementioned active materials in the negative electrode, cylindrical batteries as shown in FIG. 3 were prepared. The preparation procedure of the batteries was as follows.

$LiMn_{1.8}Co_{0.2}O_4$ as the positive electrode active material was synthesized by mixing $Li_2CO_3$, $Mn_3O_4$ and $CoCO_3$ at a predetermined molar ratio and heating the mixture at 900° C. The resulting material was classified to 100 mesh or less to give the positive electrode active material. To 100 g of the active material, 10 g of a carbon powder as a conductive agent and 8 g (in terms of the resin content) of an aqueous dispersion of polytetrafluoroethylene as a binder and a pure water were added, and a paste was prepared therefrom. The paste was applied onto a core material of aluminum, dried, and rolled to give a positive electrode plate.

As the negative electrode, each active material, a graphite powder as a conductive agent and a polytetrafluoroethylene powder as a binder were mixed at a weight ratio of 80:20:10. An petroleum type solvent was added to this mixture and they were prepared into a paste. After the paste was applied onto a core material of copper, it was dried at 100° C. to give a negative electrode plate. Porous polypropylene film was used as a separator.

To the positive electrode plate 11, a positive electrode lead 14 of aluminum was fixed by spot welding, and to the negative electrode plate 12, a negative electrode lead 15 of copper was fixed by spot welding. The positive electrode plate 11, the negative electrode plate 12, and the separator 13 separating the two electrode plates were spirally wound to form an electrode assembly. This electrode assembly was inserted into a battery case 18, with insulating plates 16 and 17 made of polypropylene placed on top and bottom of the electrode assembly, and a step was formed in an upper part of the battery case 18. Subsequently, the same non-aqueous electrolyte as described previously was poured into the case, and then the opening of the case 18 was sealed with a sealing plate 19 having a positive electrode terminal 20. The positive electrode lead 14 was connected to the positive electrode terminal 20 on the sealing plate 19 and the negative electrode lead 15 was connected to the case 18.

With each of the batteries, charge and discharge cycle test was carried out at a charge and discharge current of 1 mA/cm and a charge and discharge voltage range of 4.3 V to 2.6 V and at 30° C. Based on the discharge capacity at the second cycle, the ratio (%) of the discharge capacity at the 100th cycle was shown in Table 1 as the capacity maintenance rate.

TABLE 1

| Example | Active material | Synthesizing method | Discharge capacity mAh/g | Discharge capacity mAh/cc | Capacity maintenance rate % |
|---|---|---|---|---|---|
| 1 | $Ti_2Sn$ | MA | 330 | 780 | 95 |
| 2 | | RQ | 300 | 750 | 94 |
| 3 | NiCoSn | MA | 370 | 980 | 97 |
| 4 | | AT | 330 | 1010 | 90 |
| 5 | | RQ | 340 | 990 | 94 |
| 6 | $Mn_2Sn$ | MA | 380 | 950 | 96 |
| 7 | | AT | 340 | 910 | 91 |
| 8 | | RQ | 370 | 940 | 92 |
| 9 | $Ni_3Sn_2$ | MA | 440 | 1020 | 97 |
| 10 | | AT | 400 | 1000 | 88 |
| 11 | | RQ | 410 | 1000 | 91 |
| 12 | $Co_3Sn_2$ | MA | 480 | 1070 | 94 |
| 13 | | AT | 450 | 1030 | 89 |
| 14 | | RQ | 460 | 1050 | 89 |
| 15 | $Pd_3Sn_2$ | MA | 460 | 1150 | 95 |
| 16 | | RQ | 420 | 1080 | 93 |
| 17 | $Rh_3Sn_2$ | MA | 450 | 1180 | 94 |
| 18 | | RQ | 390 | 1100 | 90 |
| 19 | $Cu_2In$ | MA | 390 | 1070 | 93 |
| 20 | | AT | 340 | 970 | 88 |
| 21 | | RQ | 370 | 1030 | 90 |
| 22 | $Ni_2In$ | MA | 400 | 1200 | 92 |
| 23 | | AT | 320 | 1070 | 84 |
| 24 | | RQ | 360 | 1110 | 87 |
| 25 | $Ni_2Si$ | MA | 800 | 1470 | 91 |
| 26 | | AT | 650 | 1320 | 81 |
| 27 | | RQ | 740 | 1390 | 83 |
| 28 | BeSiZr | MA | 870 | 1520 | 89 |
| 29 | | AT | 790 | 1470 | 79 |
| 30 | | RQ | 810 | 1500 | 85 |

In the synthesizing method in Table 1, MA, AT and RQ represent respectively mechanical alloying method, gas atomizing method and roll quenching method.

COMPARATIVE EXAMPLES 1–11

Next, as comparative examples, an alloy having a known composition was prepared by the same synthesizing method as described above, and the same test as above was carried out. Also, the same test was carried out with a graphite negative electrode (thermally treated mesophase small sphere), which is generally in use. The electrode mixture containing graphite was prepared by mixing a graphite powder and polytetrafluoroethylene at a weight ratio of 10:1. The test shown in Table 2.

TABLE 2

| Comparative Example | Active material | Synthesizing method | Discharge capacity mAh/g | Discharge capacity mAh/cc | Capacity maintenance rate % |
|---|---|---|---|---|---|
| 1 | $Mg_2Sn$ | MA | 570 | 1680 | 21 |
| 2 | | AT | 610 | 1700 | 10 |
| 3 | | RQ | 640 | 1730 | 12 |
| 4 | $FeSn_2$ | MA | 520 | 2350 | 38 |
| 5 | | AT | 410 | 2040 | 24 |
| 6 | | RQ | 490 | 2430 | 25 |
| 7 | $Mg_2Si$ | MA | 720 | 2140 | 21 |
| 8 | | RQ | 690 | 2080 | 15 |
| 9 | TiAl | MA | 840 | 2400 | 17 |
| 10 | | RQ | 760 | 2290 | 18 |
| 11 | Graphite | — | 300 | 430 | 99 |

The alloy negative electrodes of the comparative examples generally have a high capacity but have a short cycle life. On the other hand, the graphite negative electrode has a long cycle life but a low capacity. In contrast, the battery using the active materials of the present invention in the negative electrode has a high capacity compared with those of the comparative examples, and further, they have remarkably improved cycle characteristics.

In the above examples, although the description was made in connection with a cylindrical battery, the present invention should never be limited to this structure. It goes without saying that the present invention is also applicable to coin, rectangular, and flat type secondary batteries and the like. Further, in the examples, although the description was made concerning the case of using $LiMn_{1.8}Co_{0.2}O_4$, as the positive electrode active material, it is needless to say that the negative electrode of the present invention has a similar effect when it is combined with a rechargeable positive electrode, which is known as useful in this type of non-aqueous electrolyte secondary battery. Examples of such positive electrode active material include $LiMn_2O_4$, $LiCoO_2$, $LiNiO_2$ and the like.

As described above, the present invention provides a negative electrode having a high capacity and extremely excellent cycle life characteristics. Accordingly, the present invention provides a non-aqueous electrolyte secondary battery which has a higher energy density and which is highly reliable without a fear of occurrence of short circuit caused by dendrites.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A non-aqueous electrolyte secondary battery comprising a rechargeable positive electrode, a non-aqueous electrolyte and a rechargeable negative electrode, wherein the negative electrode comprises an alloy having a hexagonal closest packing structure and a $Ni_2In$ type structure composed of at least two elements.

2. The non-aqueous electrolyte secondary battery in accordance with claim 1, wherein the alloy has a particle diameter of 45 µm or less.

3. The non-aqueous electrolyte secondary battery in accordance with claim 1, wherein the alloy comprises an intermetallic compound containing at least one element selected from the group consisting of Sn, Si, and In, and the negative electrode comprises a mixture of at least the intermetallic compound and a conductive agent.

4. The non-aqueous electrolyte secondary battery in accordance with claim 3, wherein the conductive agent is selected from the group consisting of carbon black, acetylene black and graphite.

5. A non-aqueous electrolyte secondary battery comprising a rechargeable positive electrode, a non-aqueous electrolyte and a rechargeable negative electrode, wherein the negative electrode comprises an alloy of at least two elements and the alloy comprises at least one intermetallic compound selected from the group consisting of $Ti_2Sn$, NiCoSn, $Mn_2Sn$, BeSiZr, $Cu_2In$, $Ni_2Si$, $Pd_3Sn_2$ and $Rh_3Sn_2$.

6. The non-aqueous electrolyte secondary battery in accordance with claim 5, wherein the alloy has a particle diameter of 45 µm or less.

7. The non-aqueous electrolyte secondary battery in accordance with claim 5, wherein the negative electrode comprises a mixture of at least the intermetallic compound and a conductive agent.

8. The non-aqueous electrolyte secondary battery in accordance with claim 7, wherein the conductive agent is selected from the group consisting of carbon black, acetylene black and graphite.

9. A non-aqueous electrolyte secondary battery comprising a rechargeable positive electrode, a non-aqueous electrolyte and a rechargeable negative electrode, wherein the negative electrode comprises an alloy having a hexagonal closest packing structure and a $Ni_2In$ type structure composed of at least two elements, and the alloy is amorphous or low crystalline and has a grain size of 10 µm or less.

10. The non-aqueous electrolyte secondary battery in accordance with claim 9, wherein the alloy has a particle diameter of 45 µm or less.

11. The non-aqueous electrolyte secondary battery in accordance with claim 9, wherein the alloy comprises an intermetallic compound containing at least one element selected from the group consisting of Sn, Si, and In, and the negative electrode comprises a mixture of at least the intermetallic compound and a conductive agent.

12. The non-aqueous electrolyte secondary battery in accordance with claim 11, wherein the conductive agent is selected from the group consisting of carbon black, acetylene black and graphite.

* * * * *